United States Patent [19]

Wolanin

[11] Patent Number: 5,762,367
[45] Date of Patent: Jun. 9, 1998

[54] AIR BAG MODULE WITH INFLATION CONTROL DEVICE

[75] Inventor: Michael John Wolanin, Hartland, Mich.

[73] Assignee: General Motors Corporation, Detroit, Mich.

[21] Appl. No.: 835,661

[22] Filed: Apr. 10, 1997

[51] Int. Cl.[6] .................................................. B60R 21/26
[52] U.S. Cl. ........................ 280/736; 280/742; 280/743.2
[58] Field of Search .............................. 280/743.1, 743.2, 280/728.1, 739, 742, 735, 736, 741

[56] References Cited

U.S. PATENT DOCUMENTS 5,246,250   9/1993   Wolanin et al. .

FOREIGN PATENT DOCUMENTS 3-62951   4/1993   Japan ........................ 280/736
3618060   12/1987   United Kingdom ............ 280/739

Primary Examiner—Paul N. Dickson
Attorney, Agent, or Firm—Kathryn A. Marra

[57] ABSTRACT

An air bag module for protection of a vehicle occupant includes an inflation control device. The module includes an air bag and an inflator for discharging inflator gas for inflating the air bag. The inflator has a first stage of inflation for discharging a predetermined first amount of inflator gas and has a second stage of inflation for discharging a predetermined second amount of inflator gas. A switch member is operatively connected to the inflator. The switch member is disposable between a first position in which the inflator discharges the first stage of gas and a second position in which the inflator discharges the second stage of gas. A tether has a first end operatively associated with the switch member and a second end operatively associated with the air bag. The first end of the tether changes the switch member from the first position to the second position when the tether is tensioned a predetermined amount during air bag inflation.

16 Claims, 4 Drawing Sheets

AIR BAG MODULE WITH INFLATION CONTROL DEVICE

TECHNICAL FIELD

This invention relates to an air bag module including a device for controlling inflation of an air bag.

BACKGROUND OF THE INVENTION

It is well known in the prior art to provide an air bag module which includes an inflatable air bag for protection of a vehicle occupant. The air bag module typically includes an inflator for discharging inflator gas to inflate the air bag. Upon sensing certain predetermined vehicle conditions, such as a certain amount of vehicle deceleration, the inflator discharges a fixed amount of inflator gas and the air bag is deployed.

In some cases, it may be desirable to provide an inflator that has varied levels of inflator gas output in response to the sensing of different vehicle or occupant conditions. Thus, it is also known in the prior art to provide a dual-stage inflator that can discharge predetermined amounts of gas at first or second levels. There are many different known methods of determining when to deploy the first and second levels of inflation. Many of these methods involve the use of radar, sonar, ultrasonic or electronic sensors that signal to the inflator when to deploy the first or second stage of gas. These sensors may be used to measure the amount of deceleration, seat position or occupant mass and body position. The sensor arrangements can be complicated and typically require multiple sensors, especially for determining the body position of the occupant.

SUMMARY OF THE INVENTION

This invention provides advantages and alternatives over the prior art by providing an air bag module that controls the level of inflator gas discharged into the air bag. Advantageously, this can be accomplished independent of radar, sonar, ultrasonic or other electronic sensors. Also, advantageously, this device is responsive to the actual position of the occupant without requiring a complicated arrangement of vehicle sensors. This device can be used either independently or in association with other sensing devices as an additional level of control of the inflator. Advantageously, the inflation control device which senses occupant position and controls the level of inflation is preferably mounted and stored with the air bag module as an integral package so that changes do not need to be made to other vehicle components to implement this device. In addition, the device does not require any external sensors for determining occupant position that are mounted in aesthetically displeasing locations.

These advantages are accomplished in the present invention by providing an air bag module having an inflation control device. The module includes an air bag and an inflator for discharging inflator gas for inflating the air bag. The inflator has a first stage of inflation for discharging a predetermined first amount of inflator gas and has a second stage of inflation for discharging a predetermined second amount of inflator gas. A switch member is operatively connected to the inflator. The switch member is disposable between a first position in which the inflator discharges the first stage of gas and a second position in which the inflator discharges the second stage of gas. A tether has a first end operatively associated with the switch member and a second end operatively associated with the air bag. The first end of the tether changes the switch member from the first position to the second position when the tether is tensioned a predetermined amount during air bag inflation.

Preferably, the air bag has a face panel positioned adjacent the vehicle occupant during air bag deployment and the second end of the tether is attached to the face panel. The switch member remains in the first position and the tether is slack when the face panel is restricted, such as by the vehicle occupant. In this deployment condition, only the first stage of inflation gas is discharged. When the face panel is unrestricted, the tether is tensioned and the switch member is switched to the second position such that the second stage of inflation gas is discharged.

It will be appreciated that the second end of the tether may be attached to either the inside or the outside of the air bag. Also, the tether may be located substantially internal or substantially external to the air bag. The switch member may be located either inside or outside of a housing of the module which contains the air bag and inflator.

In accordance with further preferred aspects of the invention, the switch member includes a movable portion and the second end of the tether is attached to the movable portion of the switch member. When the tether is slack, the movable portion remains in place and keeps the switch member in the first position. When the tether is tensioned, the movable portion is moved and changes the switch member from the first position to the second position for signaling the inflator to discharge the second stage of inflator gas.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
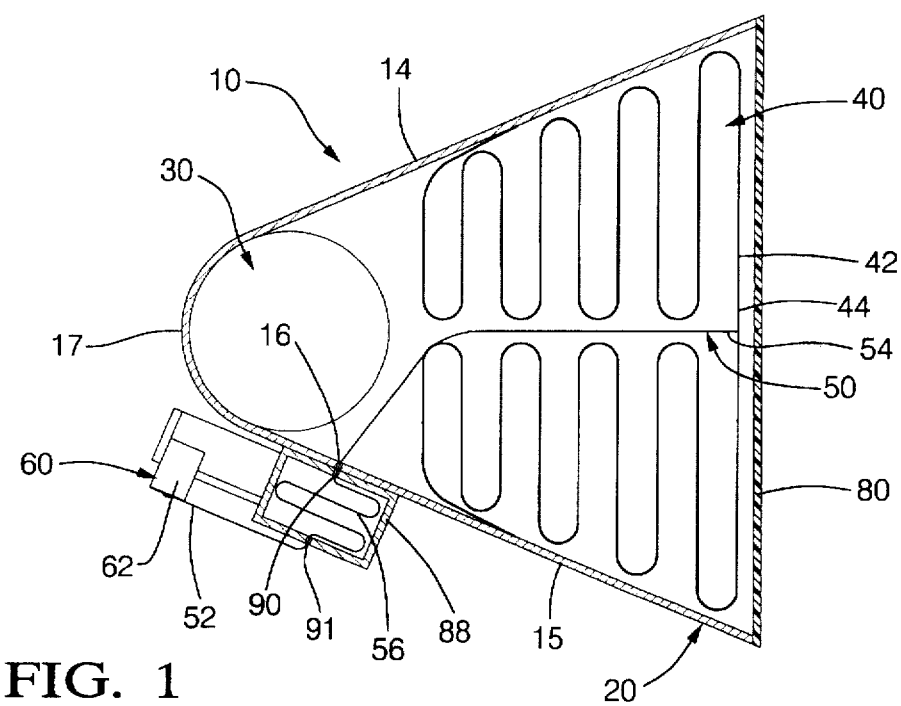
FIG. 1 is a sectional view showing an air bag module prior to air bag deployment and having an internal tether.

Referring to FIG. 1, an air bag module 10 is mounted in a vehicle (not shown) for protection of a vehicle occupant (not shown). The module 10 includes a housing 20, an inflatable air bag 40, and an inflator 30 for generating gas to inflate the air bag 40. The module 10 shown is typically mounted on the passenger side of the vehicle, but the present invention could also be used in a module mounted in any other location on the vehicle. The module 10 is secured to the vehicle in any suitable manner. The module 10 further includes a tether 50 for operating a switch member 60 for controlling the amount of inflator gas delivered to the air bag 40, as described in detail hereinafter.

The housing 20 preferably stores the inflator 30 and air bag 50 prior to deployment. The housing 20 includes opposing upper and lower side walls 14, 15 joined by a bottom wall 17 and opposing end walls (not shown). The inflator 30 is preferably suitably secured to the end walls of the housing 20. The module 10 includes a housing opening 19 through which the air bag 40 deploys.

The inflator 30 may be of any conventional construction for generating inflator gas to inflate the air bag 40. The inflator 30 preferably has a generally cylindrical construction and discharge ports (not shown) through which gas is expelled to inflate the air bag 40. The inflator 30 is preferably a dual stage inflator 30 having a first stage of inflation for discharging a predetermined first amount of inflator gas when the vehicle experiences a certain predetermined amount of deceleration. The inflator 30 also has a second stage of inflation for discharging a predetermined second amount of inflator gas upon receiving a signal from the switch member 60 activated by tension in the tether 50, as described further hereinafter. Preferably, the second amount of inflator gas is added to the first amount of inflator gas to increase air bag 40 inflation when air bag deployment is unrestricted and the tether 50 has a predetermined amount of tension, as described further below.

The air bag 40 may be of any conventional construction for inflating upon the discharge of inflator gas. The air bag 40 is preferably made of a flexible fabric or other suitable material for air bag construction. Referring to FIG. 1, the air bag 40 is shown in the folded condition stored atop the inflator 30 prior to inflator activation. The air bag 40 may be attached to the housing 20 in any suitable manner, such as by a cushion retainer (not shown). Preferably, the tether 50 is located generally internal to the air bag 40 with approximately half of the air bag 40 folded on one side of the tether 50 and approximately the other half of the air bag 40 folded on the other side of the tether 50. Upon activation of the inflator 30, the air bag 40 is filled with inflator gas and deploys out through the housing opening 19 for protection of the vehicle occupant. The housing opening 19 is normally closed by a suitable cover 80 prior to air bag inflation. The air bag 40 includes a rearwardly facing face panel 42 which is positioned adjacent the vehicle occupant during air bag deployment. The face panel 42 has a generally central portion 44 to which the tether 50 is attached. During deployment, the face panel 42 is displaced generally rearward and determines the tension on the tether 50, as described further hereinafter.

The switch member 60 is operatively connected to the inflator 30. The switch member 60 has a first position in which the inflator 30 discharges the first stage of gas and a second position for signaling the inflator 30 to discharge the second stage of gas. The switch member 60 may send the signal to the inflator 30 in any suitable manner. The switch member 60 is preferably disposed on the lower side wall 15 of the housing 20. Preferably, the switch member 60 is located outside of the housing 20, but it will also be appreciated that the switch member 60 may be located inside the housing 20. The switch member 60 is also preferably mounted adjacent a guide member 88, as described below. The switch member 60 is shown schematically in FIGS. 1–3 as having a movable portion 62 which is movable between the first position and the second position for activation of either the first or second stage of the inflator 30. However, it will be appreciated that the switch member 60 may be any suitable type of switch member 60 that changes disposition in response to tension on the tether 50 either by movement of a movable portion 62 or simply by application of the tension load from the tether 50. Thus, it will be appreciated that many possible switch members 60 may be used and are not limited to the one example shown.

The tether 50 may be any kind of strap made of any suitable flexible material, such as a nylon strip or a wire, but preferably is made of the same material as the air bag 40. The tether 50 may be made separately and attached to the air bag 40 or may be a continuous extension of the air bag 40 material. The tether 50 includes a first end 52 operatively associated with the switch member 60 and a second end 54 operatively associated with the air bag 40. The first end 52 of the tether 50 is preferably attached to the movable portion 62 of the switch member 60 and the second end 54 of the tether 50 is preferably attached to the generally central portion 44 of the face panel 42 of the air bag 40. The first end 52 of the tether 50 is used for moving the movable portion 62 of the switch member 60 from the first position to the second position when the second end 54 of the tether 50 is moved a sufficient amount during air bag deployment to tension the tether 50 by a predetermined amount.

As best shown in FIG. 1, a guide member 88 is disposed on one of the side walls 14, 15 of the housing 20, preferably being the lower side wall 15. The guide member 88 may be attached to the housing 20, such as by welding, or integrally formed with the housing 20. The tether 50 slidably extends through the guide member 88. A slackened portion 56 of the tether 50 is stored in a folded condition within the guide member 88 prior to air bag deployment. The guide member 88 includes a first opening 90 through which the tether 50 extends for connection to the air bag 40 and a second opening 91 through which the tether 50 extends for connection to the movable portion 62 of the switch member 60. The guide member 88 also helps to guide the tether 50 during air bag deployment and holds the tether 50 in position relative to the air bag 40 as it feeds out through the first opening 90.

Figure 2:
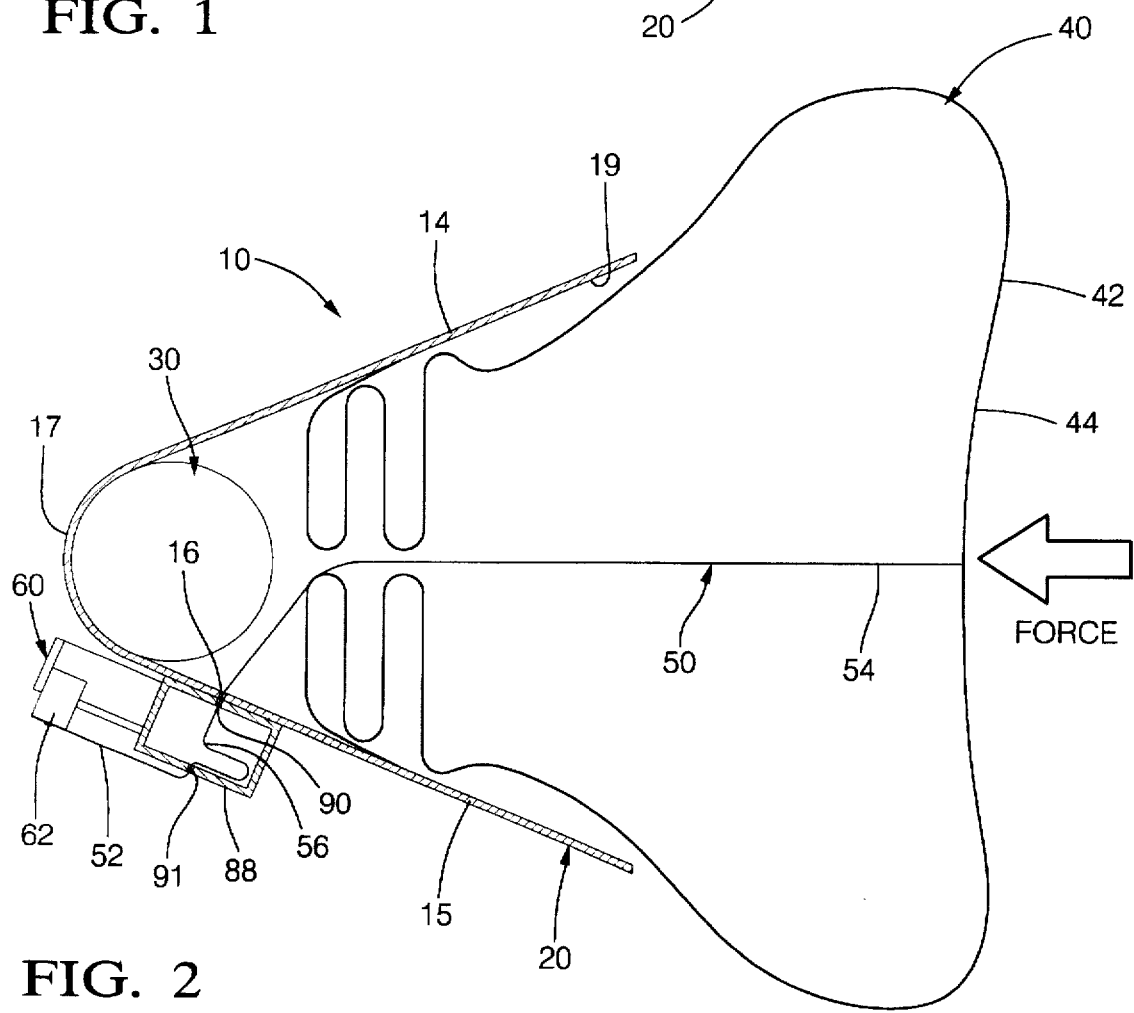
FIG. 2 is a sectional view similar to FIG. 1, but showing the air bag in a deployed condition and being restricted during deployment.
Figure 3:
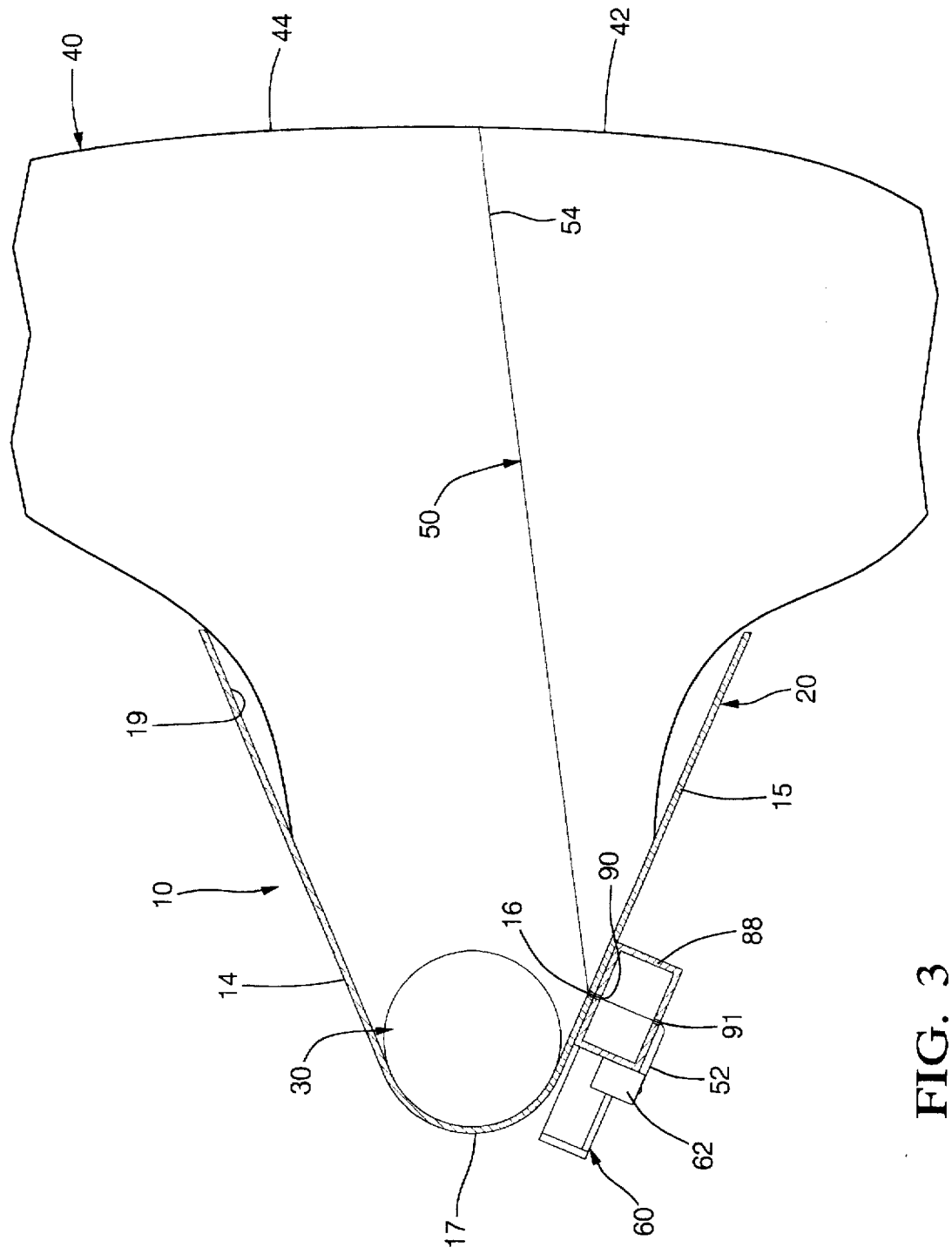
FIG. 3 is a sectional view similar to FIG. 1, but showing the air bag in a deployed condition and being unrestricted during deployment.

FIGS. 1–3 schematically demonstrate different air bag deployment conditions. FIG. 1 shows the module 10 prior to air bag inflation. The air bag 40 is stored in a folded condition within the housing 20 and the tether 50 is in a generally relaxed, slackened condition such that no load is applied to the switch member 60. The slackened portion 56 of the tether 50 is positioned adjacent the switch member 60 and is stored in a folded condition within the guide member 88.

Upon sensing a predetermined amount of vehicle deceleration, the vehicle signals the inflator 30 to deploy the first stage of inflation gas. As shown in FIG. 2, the air bag 40 begins to deploy out through the housing opening 19 and the tether 50 begins to feed out through the first opening 90 in the guide member 88 and a mating aperture 16 in the housing 20. In this deployment condition, the displacement of the face panel 42 is limited by the position of the vehicle occupant which engages the face panel 42 and applies a reactive force as shown by the arrow. Accordingly, the tether 50 remains in a slackened condition such that the slackened portion 56 of the tether 50 is not placed in tension and a load is not applied to the switch member 60. Thus, the movable portion 62 of the switch member 60 is not moved and the movable portion 62 remains in the first position. Due to the lack of tension on the tether 50, the switch member 60 does not signal the inflator 30 to discharge the second stage of inflator gas when the occupant engages the air bag 40 during the early stages of inflation and restricts rearward displacement of the face panel 42.

Advantageously, inflation of the air bag 40 can be controlled by interaction of the occupant with the air bag 40 and completely independent of other sensor readings by the use of the mechanical device of the tether 50. Also advantageously, air bag inflation can be limited based on occupant position without having a multiplicity of sensors for determining occupant position.

FIG. 3 shows a different deployment condition in which the face panel 42 of the air bag 40 has obtained a further degree of rearward displacement such that the tether 50 has become tensioned. In this deployment condition, the displacement of the face panel 42 is unrestricted by interaction with the vehicle occupant. Accordingly, the tether 50 is fed out through the guide member 88 and is pulled taught and applies a load on the switch member 60. Thus, the movable portion 62 of the switch member 60 is moved from the first position to the second position and signals the inflator 30 to discharge the second stage of inflator gas to further inflate the air bag 40 for protection of the vehicle occupant.

It will be understood that a person skilled in the art may make modifications to the preferred embodiment shown herein within the scope and spirit of the claims. Although the inflator 30 is preferably a dual stage inflator 30, it will be appreciated that two single stage inflators may also be used. It will further be appreciated that although a single tether 50 is shown, more than one tether 50 may also be used to activate one or more inflators 30 based on displacement of the air bag 50. Although the switch member 60 preferably includes a movable portion 62, it will be appreciated that the movable portion 62 may be eliminated and the switch member 60 may be changed from the first position to the second position without any actual movement of a movable portion 62. For example, the switch member 60 could simply change from the first position to the second position based on the tension applied to a portion of the switch member 60 which is not movable. Although the switch member 60 and guide member 88 are shown as both preferably being mounted on the outside of the housing 20, it will further be appreciated that the switch member 60 and guide member 88 could both be mounted on the inside of the housing 20 or one on the inside and one on the outside. It will further be appreciated that the switch member 60 or guide member 88 could also be mounted directly on the inflator 30. Also, the switch member 60 and guide member 88 could be mounted on other parts of the vehicle or the module 10 for modules not including a separate housing 20 or wherein the housing is integrally formed with the vehicle.

Figure 4:
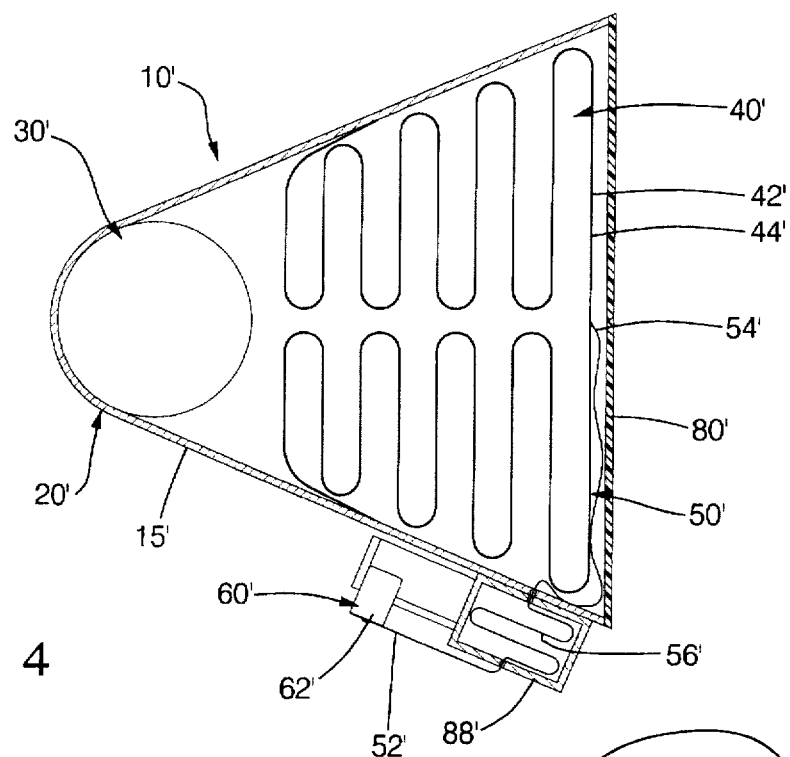
FIG. 4 is a sectional view of an alternate embodiment of the invention and showing an air bag module prior to air bag deployment and having an external tether.
Figure 5:
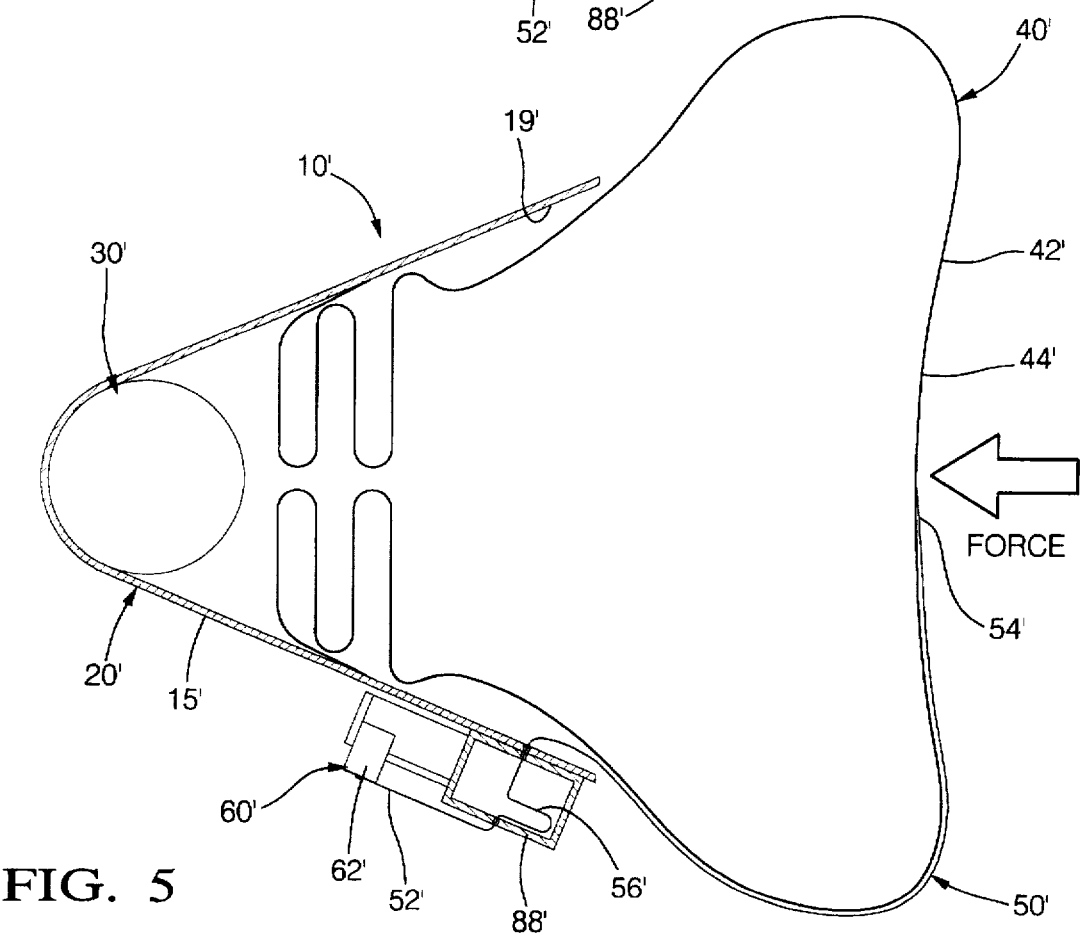
FIG. 5 is a sectional view similar to FIG. 4, but showing the air bag in a deployed condition and being restricted during deployment.
Figure 6:
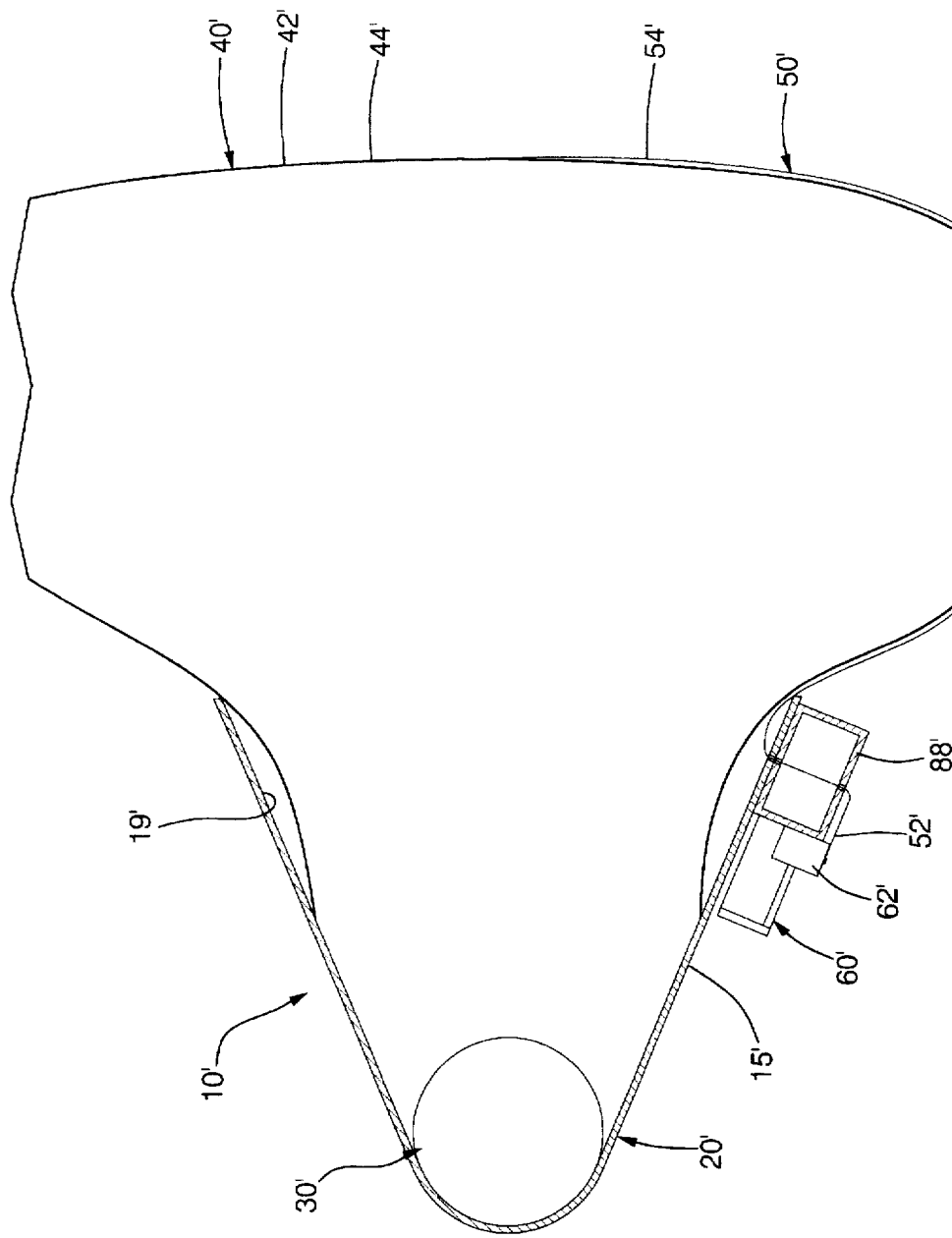
FIG. 6 is a sectional view similar to FIG. 4, but showing the air bag in a deployed condition and being unrestricted during deployment.

It will further be appreciated that the tether 50 need not be positioned substantially internal to the air bag 40. For example, FIGS. 4–6 show an alternate embodiment of the invention in which the tether 50' is positioned substantially external to the air bag 40'. Components similar to those in FIGS. 1–3 are denoted with similar numerals with a prime added and have a similar description except for any variations described below.

Referring to FIG. 4, the air bag module 10' is mounted in a vehicle for protection of a vehicle occupant. The housing 20' preferably stores the inflator 30' and air bag 50' prior to deployment. The inflator 30' may be of any conventional construction for generating inflator gas to inflate the air bag 40'. The inflator 30' is preferably a dual stage inflator 30' having a first stage of inflation for discharging a predetermined first amount of inflator gas when the vehicle experiences a certain predetermined amount of deceleration. The inflator 30' also has a second stage of inflation for discharging a predetermined second amount of inflator gas upon receiving a signal from a switch member 60 activated by tension in the tether 50', as described further hereinafter. However, it will be appreciated that two single stage inflators could also be used. Preferably, the second amount of inflator gas is added to the first amount of inflator gas to increase air bag 40' inflation when air bag deployment is unrestricted and the tether 50' has a predetermined amount of tension.

The air bag 40' may be of any conventional construction for inflating upon the discharge of inflator gas. Referring to FIG. 4, the air bag 40' is shown in the folded condition stored atop the inflator 30' prior to inflator activation. Preferably, the tether 50' is located generally external to the air bag 40' with the entire air bag 40' preferably being folded atop the tether 50'. Upon activation of the inflator 30', the air bag 40' is filled with a predetermined amount of inflator gas and deploys out through the housing opening 19' for protection of the vehicle occupant. The housing opening 19' is normally closed by a suitable cover 80' prior to air bag inflation. The air bag 40' includes a rearwardly facing face panel 42' which is positioned adjacent the vehicle occupant during air bag deployment. The face panel 42' has a generally central portion 44' to which the tether 50' is attached.

The switch member 60' is operatively connected to the inflator 30'. The switch member 60' has a first position in which the inflator 30' discharges the first stage of gas and a second position for signaling the inflator 30' to discharge the second stage of gas. The switch member 60' is preferably disposed on the lower side wall 15' of the housing 20' and in closer proximity to the housing opening 19' than in the embodiment of FIGS. 1–3. Preferably, the switch member 60' is located outside of the housing 20', but it will also be appreciated that the switch member 60' may be located inside the housing 20'. The switch member 60' is shown schematically in FIGS. 4–6 as having a movable portion 62' which is movable for disposition of the switch member 60' between the first position and the second position for activation of either the first or second stage inflation.

The tether 50' includes a first end 52' operatively associated with the switch member 60' and a second end 54' operatively associated with the air bag 40'. The first end 52' of the tether 50' is preferably attached to the movable portion 62' of the switch member 60' and the second end 54' of the tether 50' is preferably attached to the generally central portion 44' of the face panel 42' of the air bag 40'. As best shown in FIG. 4, a guide member 88' is disposed on the housing 20' for storing a slackened portion 56' of the tether 50' and for guiding the tether 50' during air bag deployment.

FIGS. 4–6 schematically demonstrate different air bag deployment conditions, similar to FIGS. 1–3. FIG. 4 shows the module 10' prior to air bag inflation. The air bag 40' is stored in a folded condition within the housing 20' and the tether 50' is in a generally relaxed, slackened condition such that no load is applied to the switch member 60'. The slackened portion 56' of the tether 50' is positioned adjacent the switch member 60' and is stored in a folded condition within the guide member 88'.

Upon sensing a predetermined amount of vehicle deceleration, the vehicle signals the inflator 30' to deploy the first stage of inflation gas. As shown in FIG. 5, the air bag 40' begins to deploy out through the housing opening 19' and the tether 50' is fed out through the guide member 88'. In this deployment condition, the displacement of the face panel 42' is limited by the position of the vehicle occupant which engages the face panel 42' and applies a reactive force as shown by the arrow. Accordingly, the tether 50' remains in a slackened condition such that the slackened portion 56' of the tether 50' is not placed in tension and a load is not applied to the switch member 60'. Thus, the movable portion 62' of the switch member 60' is not moved and the switch member 60' remains in the first position and does not signal the inflator 30' to discharge the second stage of inflator gas.

FIG. 6 shows a different deployment condition in which the face panel 42' of the air bag 40' has obtained a further degree of displacement such that the tether 50' has become tensioned. In this deployment condition, the displacement of the face panel 42' is unrestricted by interaction with the vehicle occupant. Accordingly, the tether 50' is fed out through the guide member 88' and wraps around the outside of the air bag 40' and is pulled taught and thus applies a load on the switch member 60'. Thus, the movable portion 62' of the switch member 60' is moved from the first position to the second position and signals the inflator 30' to discharge the second stage of inflator gas to further inflate the air bag 40' for protection of the vehicle occupant. It will be appreciated that the tether 50' located substantially external to the air bag 40' is preferably longer than the tether 50' located substantially internal to the air bag 40'.

While the present invention has been described as carried out in specific embodiments hereof, it is not intended to be limited thereby but is intended to cover the invention broadly within the scope and spirit of the appended claims.

What is claimed is:

1. An air bag module having an inflation control device, the module for restraint of a vehicle occupant, the module comprising:

an air bag;

an inflator for discharging inflator gas to inflate the air bag, the inflator having a first stage of inflation for discharging a predetermined first amount of inflator gas and having a second stage of inflation for discharging a predetermined second amount of inflator gas;

a switch member operatively connected to the inflator, the switch member disposable between a first position in which the inflator discharges the first stage of gas and a second position in which the inflator discharges the second stage of gas; and a tether having a first end operatively associated with the switch member and a second end operatively associated with the air bag, the first end of the tether for changing the switch member from the first position to the second position when the tether is tensioned a predetermined amount during air bag inflation.

2. The module of claim 1 wherein the air bag has a face panel positioned adjacent the vehicle occupant during air bag deployment and wherein the second end of the tether is attached to the face panel and wherein the tether is slack and the switch member remains in the first position when the face panel is restricted such that only the first stage of inflation gas is discharged and wherein the tether is tensioned and the switch member is switched to the second position when the face panel is unrestricted such that the second stage of inflation gas is discharged.

3. The module of claim 2 wherein the face panel has a generally central portion and wherein the second end of the tether is attached to the generally central portion of the face panel.

4. The module of claim 1 wherein the second end of the tether is attached to the inside of the air bag.

5. The module of claim 1 wherein the second end of the tether is attached to the outside of the air bag.

6. The module of claim 1 wherein the tether is positioned substantially internal to the air bag.

7. The module of claim 1 wherein the tether is positioned substantially external to the air bag.

8. The module of claim 1 wherein the module includes a housing for housing the inflator and air bag and wherein the switch member is disposed on the housing.

9. The module of claim 1 wherein the module includes a guide member for storing the tether partially therein prior to air bag deployment and for guiding the tether during air bag deployment.

10. The module of claim 9 wherein the guide member includes a first opening through which the tether extends for connection to the air bag and a second opening through which the tether extends for connection to the switch member.

11. The module of claim 9 wherein the switch member is mounted on the guide member.

12. The module of claim 1 wherein the switch member includes a movable portion and wherein the first end of the tether is attached to the movable portion of the switch member and wherein the movable portion remains in place and keeps the switch member in the first position when the tether is slack and wherein the movable portion is moved by tension of the tether to change the switch member to the second position for signaling the inflator to discharge the second stage of inflator gas.

13. An air bag module having an inflation control device, the module for restraint of a vehicle occupant, the module comprising:

an air bag;

an inflator for discharging inflator gas to inflate the air bag, the inflator having a first stage of inflation for discharging a predetermined first amount of inflator gas and having a second stage of inflation for discharging a predetermined second amount of inflator gas;

a switch member operatively connected to the inflator, the switch member movable between a first position in which the inflator discharges the first stage of gas and a second position in which the discharges the second stage of gas; and a tether having a first end operatively associated with the switch member and a second end operatively associated with the air bag, the first end of the tether for moving the switch member from the first position to the second position when the tether is tensioned a predetermined amount during air bag inflation.

14. The module of claim 13 wherein the air bag has a face panel positioned adjacent the vehicle occupant during air bag deployment and wherein the second end of the tether is attached to the face panel and wherein the tether is slack and the switch member remains in the first position when the face panel is restricted such that only the first stage of inflation gas is discharged and wherein the tether is tensioned and the switch member is moved to the second position when the face panel is unrestricted such that the second stage of inflation gas is discharged.

15. The module of claim 14 wherein the face panel has a generally central portion and wherein the second end of the tether is attached to the generally central portion of the face panel.

16. The module of claim 13 wherein the switch member includes a movable portion and wherein the first end of the tether is attached to the movable portion of the switch member and wherein the movable portion remains in place and keeps the switch member in the first position when the tether is slack and wherein the movable portion is moved upon tension of the tether to change the switch member to the second position for signaling the inflator to discharge the second stage of inflator gas.

* * * * *